(12) United States Patent
Nakagawa et al.

(10) Patent No.: US 10,860,106 B2
(45) Date of Patent: Dec. 8, 2020

(54) INFORMATION PROCESSING SYSTEM, CONTROLLER DEVICE, CONTROLLER DEVICE CONTROL METHOD AND PROGRAM

(71) Applicant: Sony Interactive Entertainment Inc., Tokyo (JP)

(72) Inventors: Yusuke Nakagawa, Kanagawa (JP); Ikuo Yamano, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/345,071

(22) PCT Filed: Dec. 7, 2017

(86) PCT No.: PCT/JP2017/044072
§ 371 (c)(1),
(2) Date: Apr. 25, 2019

(87) PCT Pub. No.: WO2018/110432
PCT Pub. Date: Jun. 21, 2018

(65) Prior Publication Data
US 2019/0278372 A1    Sep. 12, 2019

(30) Foreign Application Priority Data
Dec. 15, 2016 (JP) ................... 2016-243639

(51) Int. Cl.
*G06F 3/01* (2006.01)
*A63F 13/235* (2014.01)
(Continued)

(52) U.S. Cl.
CPC .............. *G06F 3/016* (2013.01); *A63F 13/22* (2014.09); *A63F 13/235* (2014.09); *A63F 13/24* (2014.09);
(Continued)

(58) Field of Classification Search
CPC . G06F 2203/013–015; G06F 3/14; G06F 3/16
See application file for complete search history.

(56) References Cited

U.S. PATENT DOCUMENTS 6,766,299 B1   7/2004   Bellomo
6,864,877 B2   3/2005   Braun
(Continued)

FOREIGN PATENT DOCUMENTS

EP   0999518 A1   5/2000
JP   0884858 A    4/1996
(Continued)

OTHER PUBLICATIONS

International Search Report for related PCT Application No. PCT/JP2017/030344, 4 pages, dated Oct. 10, 2017.
(Continued)

*Primary Examiner* — Roy P Rabindranath
(74) *Attorney, Agent, or Firm* — Matthew B. Dernier, Esq.

(57) ABSTRACT

An information processing system includes a controller device to be fastened to a user's hand and an information processing apparatus that is connected to the controller device to exchange information with the controller device. The controller device includes a vibrating element causing a housing of the controller device to vibrate, receives information indicating a vibration intensity of the vibrating element, and acquires information related to a contact area between the controller device and the user's hand so as to cause the vibrating element to vibrate. Also, the controller device or the information processing apparatus corrects information indicating the vibration intensity on a basis of information acquired by acquisition means of the controller device.

9 Claims, 4 Drawing Sheets

(51) Int. Cl.
  *A63F 13/24* (2014.01)
  *A63F 13/285* (2014.01)
  *G06F 3/033* (2013.01)
  *G06F 3/038* (2013.01)
  *A63F 13/22* (2014.01)
(52) U.S. Cl.
  CPC .............. *A63F 13/285* (2014.09); *G06F 3/01* (2013.01); *G06F 3/033* (2013.01); *G06F 3/038* (2013.01)

(56) References Cited

U.S. PATENT DOCUMENTS

| | | | |
|---|---|---|---|
| 7,218,310 | B2 | 5/2007 | Goldenberg |
| 8,248,218 | B2 | 8/2012 | Yamaya |
| 8,249,276 | B2 | 8/2012 | Hamada |
| 8,727,878 | B2 | 5/2014 | Longdale |
| 8,787,586 | B2 | 7/2014 | Hamada |
| 9,007,445 | B2 | 4/2015 | Oikawa |
| 9,070,282 | B2 | 6/2015 | Clough |
| 9,098,984 | B2 | 8/2015 | Heubel |
| 9,430,700 | B2 | 8/2016 | Yagcioglu |
| 9,436,280 | B2 | 9/2016 | Tartz |
| 9,542,745 | B2 | 1/2017 | Moteki |
| 9,630,098 | B2 | 4/2017 | Mikhailov |
| 9,753,537 | B2 | 9/2017 | Obana |
| 9,792,501 | B1 | 10/2017 | Maheriya |
| 9,846,484 | B2 | 12/2017 | Shah |
| 9,940,716 | B2 | 4/2018 | Chevassus |
| 9,946,347 | B2 | 4/2018 | Nakagawa |
| 9,952,670 | B2 | 4/2018 | Watanabe |
| 9,983,671 | B2 | 5/2018 | Adachi |
| 10,150,029 | B2 | 12/2018 | Yamano |
| 10,175,761 | B2 | 1/2019 | Cruz-Hernandez |
| 10,347,093 | B2 | 7/2019 | Rihn |
| 10,394,326 | B2 | 8/2019 | Ono |
| 10,444,837 | B2 | 10/2019 | Takeda |
| 2002/0030663 | A1 | 3/2002 | Goldenberg |
| 2002/0080112 | A1 | 6/2002 | Braun |
| 2004/0220812 | A1 | 11/2004 | Bellomo |
| 2005/0134562 | A1 | 6/2005 | Grant |
| 2007/0248235 | A1 | 10/2007 | Hamada |
| 2008/0262658 | A1 | 10/2008 | Ding |
| 2009/0017911 | A1 | 1/2009 | Miyazaki |
| 2010/0016077 | A1 | 1/2010 | Longdale |
| 2010/0085462 | A1 | 4/2010 | Sako |
| 2010/0090815 | A1 | 4/2010 | Yamaya |
| 2010/0091096 | A1 | 4/2010 | Oikawa |
| 2010/0245237 | A1 | 9/2010 | Nakamura |
| 2011/0163946 | A1 | 7/2011 | Tartz |
| 2012/0232780 | A1* | 9/2012 | Delson ................ A63F 13/06 701/400 |
| 2012/0281849 | A1 | 11/2012 | Hamada |
| 2013/0057509 | A1 | 3/2013 | Cruz-Hernandez |
| 2013/0250502 | A1 | 9/2013 | Tossavainen |
| 2013/0261811 | A1 | 10/2013 | Yagi |
| 2014/0176415 | A1 | 6/2014 | Buuck |
| 2014/0212000 | A1 | 7/2014 | Yagcioglu |
| 2014/0220520 | A1 | 8/2014 | Salamini |
| 2014/0266644 | A1 | 9/2014 | Heubel |
| 2014/0361956 | A1 | 12/2014 | Mikhailov |
| 2015/0042484 | A1 | 2/2015 | Bansal |
| 2015/0070261 | A1 | 3/2015 | Saboune |
| 2015/0243016 | A1 | 8/2015 | Moteki |
| 2015/0273322 | A1 | 10/2015 | Nakagawa |
| 2015/0302854 | A1 | 10/2015 | Clough |
| 2015/0323996 | A1 | 11/2015 | Obana |
| 2015/0339819 | A1 | 11/2015 | Chevassus |
| 2016/0012687 | A1 | 1/2016 | Obana |
| 2016/0054797 | A1* | 2/2016 | Tokubo .................. G06F 3/041 345/633 |
| 2016/0124707 | A1 | 5/2016 | Ermilov |
| 2016/0132117 | A1 | 5/2016 | Adachi |
| 2016/0162025 | A1 | 6/2016 | Shah |
| 2016/0214007 | A1 | 7/2016 | Yamashita |
| 2016/0310844 | A1 | 10/2016 | Yamashita |
| 2016/0342213 | A1 | 11/2016 | Endo |
| 2017/0038841 | A1 | 2/2017 | Takeda |
| 2017/0045991 | A1 | 2/2017 | Watanabe |
| 2017/0053502 | A1 | 2/2017 | Shah |
| 2017/0061784 | A1 | 3/2017 | Clough |
| 2017/0092084 | A1 | 3/2017 | Rihn |
| 2017/0097681 | A1 | 4/2017 | Ono |
| 2017/0205883 | A1* | 7/2017 | Tanaka ................... G06F 3/016 |
| 2017/0235364 | A1 | 8/2017 | Nakamura |
| 2017/0242486 | A1 | 8/2017 | Grant |
| 2018/0067313 | A1 | 3/2018 | Sako |
| 2018/0098583 | A1* | 4/2018 | Keller ................ A41D 19/0024 |
| 2018/0203509 | A1 | 7/2018 | Yamano |
| 2019/0105563 | A1 | 4/2019 | Yamano |
| 2019/0332174 | A1 | 10/2019 | Nakagawa |
| 2020/0225755 | A1 | 7/2020 | Lee |

FOREIGN PATENT DOCUMENTS

| | | |
|---|---|---|
| JP | 11226265 A | 8/1999 |
| JP | 2002199056 A | 7/2002 |
| JP | 2003228453 A | 8/2003 |
| JP | 2004129120 A | 4/2004 |
| JP | 2004157944 A | 6/2004 |
| JP | 2005058404 A | 3/2005 |
| JP | 2005332063 A | 12/2005 |
| JP | 2007071782 A | 3/2007 |
| JP | 3132531 U | 6/2007 |
| JP | 2007324829 A | 12/2007 |
| JP | 2008058102 A | 3/2008 |
| JP | 2009037582 A | 2/2009 |
| JP | 2009183751 A | 8/2009 |
| JP | 2010038707 A | 2/2010 |
| JP | 2010092436 A | 4/2010 |
| JP | 2011183374 A | 9/2011 |
| JP | 2012103852 | 5/2012 |
| JP | 2012226482 A | 11/2012 |
| JP | 2013052046 A | 3/2013 |
| JP | 2013054645 A | 3/2013 |
| JP | 2013516708 A | 5/2013 |
| JP | 2013145589 A | 7/2013 |
| JP | 2013243604 A | 12/2013 |
| JP | 2014179984 A | 9/2014 |
| JP | 2014528120 A | 10/2014 |
| JP | 2015053038 A | 3/2015 |
| JP | 2015513143 A | 4/2015 |
| JP | 2015118605 A | 6/2015 |
| JP | 2015121983 A | 7/2015 |
| JP | 2015158461 A | 9/2015 |
| JP | 2015185137 A | 10/2015 |
| JP | 2015200994 A | 11/2015 |
| JP | 2015215712 A | 12/2015 |
| JP | 2015225521 A | 12/2015 |
| JP | 2015228064 A | 12/2015 |
| JP | 2015228215 A | 12/2015 |
| JP | 2015230516 A | 12/2015 |
| JP | 2015231098 A | 12/2015 |
| JP | 2016002797 A | 1/2016 |
| JP | 2016131018 A | 7/2016 |
| JP | 2016527601 A1 | 9/2016 |
| JP | 2017037523 A | 2/2017 |
| JP | 2017062788 A | 3/2017 |
| WO | 02073385 A1 | 9/2002 |
| WO | 2008078523 A1 | 7/2008 |
| WO | 2015059887 A1 | 4/2015 |
| WO | 2015121971 A1 | 8/2015 |
| WO | 2015151380 A1 | 10/2015 |
| WO | 2016038953 A1 | 3/2016 |
| WO | 2016186041 A1 | 11/2016 |
| WO | 2017043610 A1 | 3/2017 |

OTHER PUBLICATIONS

International Search Report for corresponding PCT Application No. PCT/JP2017/044072, 4 pages, dated Jan. 16, 2018.

(56) References Cited

OTHER PUBLICATIONS

International Preliminary Report on Patentability and Written Opinion for related application PCT/JP2017/016552, 13 pages, dated Nov. 7, 2019.
International Search Report for related application PCT/JP2018/026551, 4 pages, dated Aug. 7, 2018.
International Search Report for related PCT Application No. PCT/JP2017/015563, 2 pages, dated Jun. 13, 2017.
International Search Report for related PCT Application No. PCT/JP2017/033925, 4 pages, dated Nov. 7, 2017.
International Search Report for related PCT Application No. PCT/JP2017/015740, 4 pages, dated Jul. 4, 2017.
International Search Report for related PCT Application No. PCT/JP2017/016552, 2 pages, dated Jun. 20, 2017.
International Preliminary Report on Patentability and Written Opinion for related PCT Application No. PCTJP2017044075, 15 pages, dated Jun. 27, 2019.
International Search Report for related PCT Application No. PCT/JP2017/044074, 4 pages, dated Jan. 16, 2018.
International Search Report for related PCT Application No. PCT/JP2017/044073, 2 pages, dated Jan. 23, 2018.
International Preliminary Report on Patentability and Written Opinion for related PCT Application No. PCT/JP2017/044073, 10 pages, dated Jun. 27, 2019.
International Preliminary Report on Patentability and Written Opinion for related PCT Application No. PCTJP2017044074, 12 pages, dated Jun. 18, 2019.
International Preliminary Report on Patentability and Written Opinion for corresponding PCT Application No. PCT/JP2017/044072, 15 pages, dated Jun. 27, 2019.
International Search Report for related PCT Application No. PCT/JP2017/030345, 2 pages, dated Sep. 26, 2017.
International Search Report for related PCT Application No. PCT/JP2017/030909, 3 pages, dated Sep. 26, 2017.
International Preliminary Report on Patentability and Written Opinion for related PCT Application No. PCT/JP2017/030344, 13 pages, dated Mar. 5, 2020.
International Preliminary Report on Patentability and Written Opinion for related PCT Application No. PCT/JP2017/030345, 11 pages, dated Mar. 5, 2020.
International Preliminary Report on Patentability and Written Opinion for related PCT Application No. PCT/JP2017/030932, 16 pages, dated Mar. 12, 2020.
International Preliminary Report on Patentability and Written Opinion for related PCT Application No. PCT/JP2017/0030909, 11 pages, dated Mar. 12, 2020.
International Preliminary Report on Patentability and Written Opinion for related PCT Application No. PCT/JP2017/015563, 13 pages, dated Oct. 31, 2019.
International Preliminary Report on Patentability and Written Opinion for corresponding PCT Application No. PCT/JP2017/044074, 15 pages, dated Jun. 27, 2019.
Notification of Reason for Refusal for related JP Patent Application No. JP 2018-556628, 17 pages, dated Feb. 18, 2020.
International Preliminary Report on Patentability and Written Opinion for related PCT Application No. PCT/JP2017/033925 16 pages, dated Oct. 31, 2019.
International Preliminary Report on Patentability and Written Opinion for related PCT Application No. PCT/JP2017/015740 14 pages, dated Oct. 31, 2019.
Office Action for related U.S. Appl. No. 16/500,651, 7 pages, dated Apr. 16, 2020.
Notice of Reasons for Refusal for corresponding JP Application No. 2019513214, 12 pages, dated Apr. 28, 2020.

* cited by examiner

INFORMATION PROCESSING SYSTEM, CONTROLLER DEVICE, CONTROLLER DEVICE CONTROL METHOD AND PROGRAM

TECHNICAL FIELD

The present invention relates to an information processing system, a controller device, a controller device control method, and a program.

BACKGROUND ART

A controller device for a home gaming console or other machine detects user operations including pressing of buttons and swinging of the device and sends out, to a main body of the gaming console, information indicating the detected user operations. Of such controller devices, some hitherto known are worn on a user's hand like a glove to detect finger motions.

SUMMARY

Technical Problem

Also, some of these controller devices have a vibrating element that feeds back vibration to the user. Such controller devices cause the vibrating element to vibrate at a vibration intensity input from an information processing apparatus such as home gaming console.

However, the vibration perceived by the user as a result of the vibration of the controller device varies depending on the degree of close contact between the user's hand and the controller device. Also, there are cases in which the degree of close contact varies from one play to another depending on the manner in which the controller device is fastened to the hand. For this reason, a situation may occur, for example, in which a bodily sensation based on the vibration intensity to be supposedly presented and the vibration actually felt by the user are different or vibration of the same intensity varies from one play to another.

The present invention has been devised in light of the above circumstances, and it is an object of the present invention to provide a controller device and a program that can present a more stable bodily sensation to the user.

Solution to Problem

One aspect of the present invention for solving the above problem of the prior art is an information processing system including a controller device to be fastened to a user's hand, and an information processing apparatus connected to the controller device to exchange information with the controller device. The controller device includes a vibrating element causing a housing of the controller device to vibrate and has reception means, acquisition means, and vibration control means. The reception means receives information indicating at least one of a vibration intensity of the vibrating element and a vibration frequency thereof. The acquisition means acquires information regarding a state of contact between the controller device and the user's hand. The vibration control means causes the vibrating element to vibrate. The controller device or the information processing apparatus includes correction means correcting information indicating at least one of the vibration intensity and the vibration frequency on a basis of information acquired by the acquisition means of the controller device. The vibration control means of the controller device causes the vibrating element to vibrate at the vibration intensity and the vibration frequency indicated by the corrected information.

DESCRIPTION OF EMBODIMENT

A description will be given below of an embodiment of the present invention with reference to drawings. It should be noted that, in the description given below, sizes of different sections, a ratio in size therebetween, an arrangement thereof, and so on are merely examples, and that examples of the present embodiment are not limited to the illustrated size, ratio, and arrangement.

The information processing system according to the embodiment of the present invention includes an information processing apparatus 1 and a controller device 20. Here, the information processing apparatus 1 is, for example, computer equipment such as home gaming console, and the controller device 20 is connected to this information processing apparatus 1.

The controller device 20 according to the embodiment of the present invention is worn on a user's left or right hand and fastened. In the description given below, in the case where there is a need to distinguish between the controller device 20 fastened to the user's left hand and the controller device 20 fastened to the user's right hand, the controller device 20 fastened to the user's left hand and the controller device 20 fastened to the user's right hand will be denoted as a controller device 20L with an added "L" and a controller device 20R with an added "R" for distinction, respectively.

Figure 1:
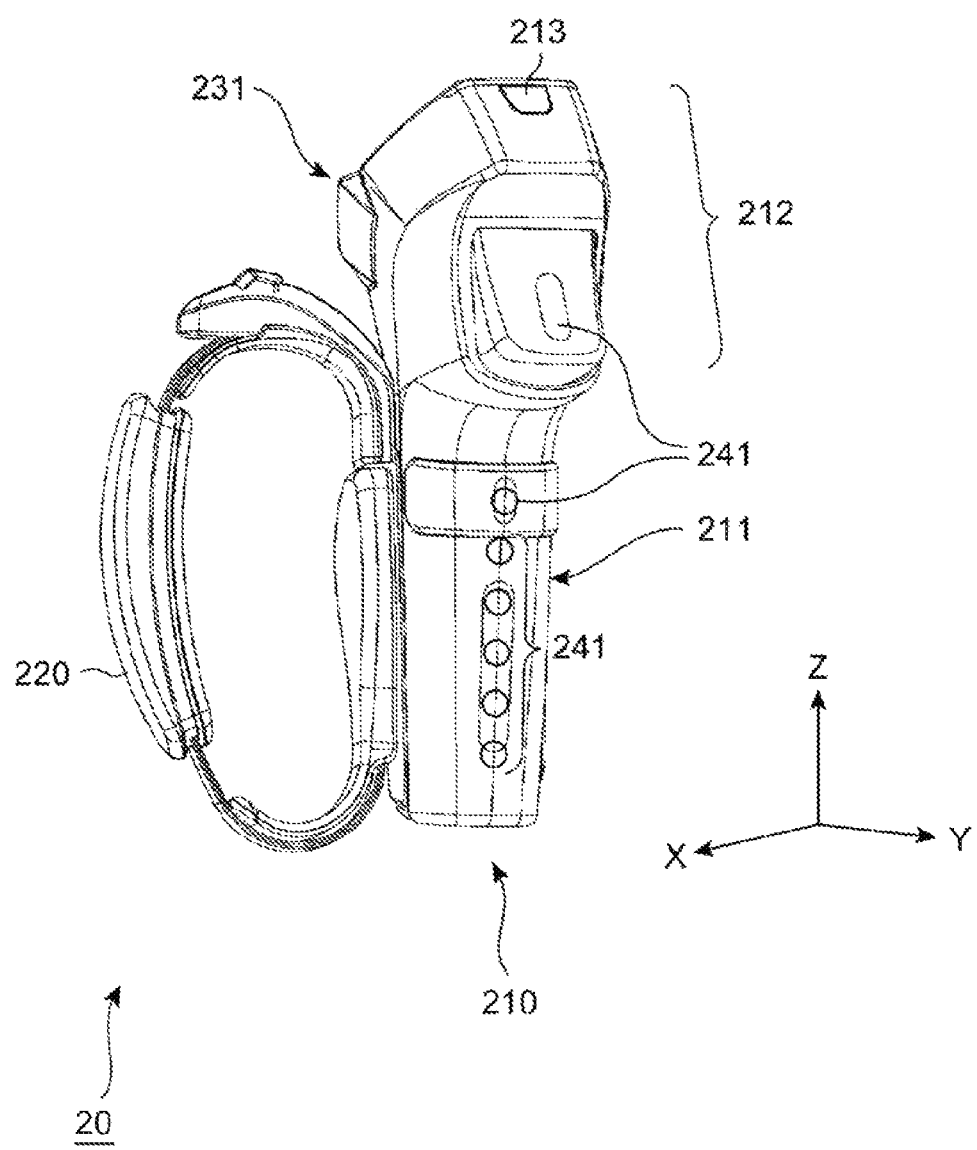
FIG. 1 is a schematic explanatory diagram illustrating an example of a controller device according to an embodiment of the present invention.
Figure 2:
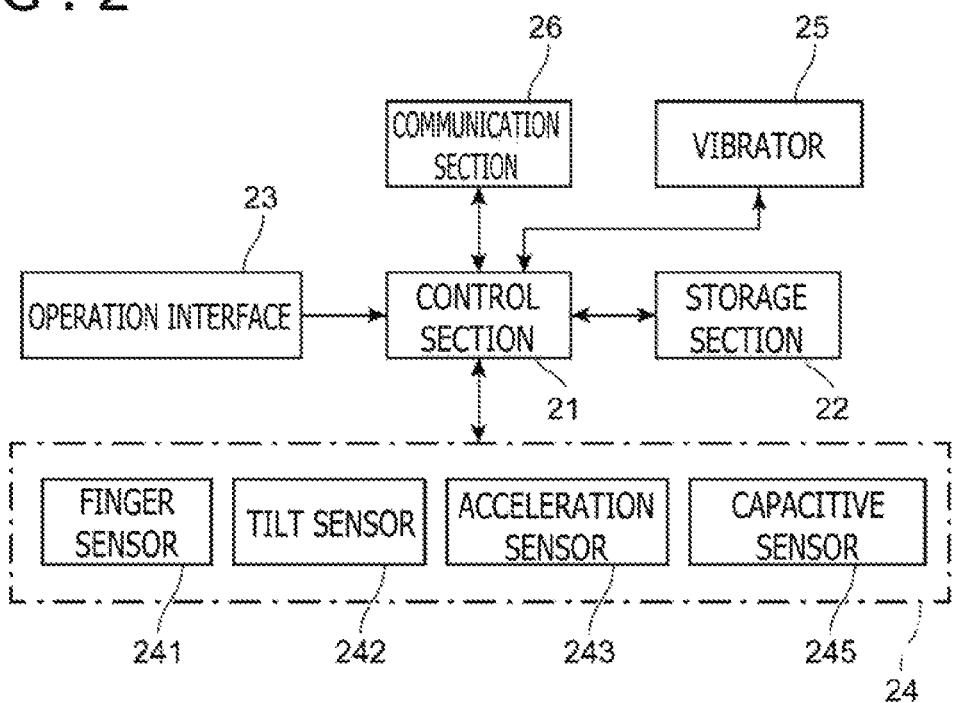
FIG. 2 is a configuration block diagram illustrating an example of the controller device according to the embodiment of the present invention.

This example of the controller device 20 includes a device main body 210 and a fixture 220 that is fastened to the device main body 210 as outlined in FIG. 1. Also, this controller device 20 includes a circuit section that includes, in the device main body 210, a control section 21, a storage section 22, an operation interface 23, a sensor section 24, a vibrator 25, and a communication section 26, as illustrated in FIG. 2.

The device main body 210 worn on the user's left hand and that worn on the user's right hand may have the same shape. In an example of the present embodiment, we assume that the fixture 220 has, for example, a flexible belt and buckle and that the belt and the buckle form an annular portion whose diameter is adjustable. Then, the user passes his or her index finger through little finger through the annular portion, adjusts, as appropriate, the diameter of the annular portion in such a manner that the device main body 210 is fastened at the position where the device main body 210 is in contact with a base of a user's thumb (position corresponding to metacarpal phalangeal (MP) joints of the index to little fingers), and fastens the device main body 210 with the buckle.

The device main body 210 includes a grip section 211 gripped by the user, an operation section 212, and a position presentation section 213. The grip section 211 is substantially in the shape of a polygonal column in an example of the present embodiment. The operation section 212 is formed continuously from the grip section 211 and includes a button operation section 231 in the example illustrated in FIG. 1. Also, finger sensors 241 of the sensor section 24 which will be described later are provided on a lateral side of this device main body 210 (side facing the fingers when a rear side of the device main body 210 is brought into contact with the user's palm). The position presentation section 213 is provided on the top (thumb side when the device main body 210 is fastened to the user's hand) rear side and includes, for example, at least a light-emitting element such as a light emitting diode (LED). We assume that this position presentation section 213 emits light of a predetermined color specific to each of the controller devices 20 during operation of the controller device 20. Also, this position presentation section 213 need only be able to detect the position of each of the controller devices 20 from outside thereof by detecting a marker of a color specific to each of the controller devices 20, and the position presentation section 213 need not necessarily be a light-emitting element.

Also, the controller device 20 is sized such that when the user grips the device main body 210 in a natural manner, one end thereof is located slightly more outward than the position reached by a tip of the user's thumb and the other end thereof is located at a position slightly protruding from the base of the user's little finger (position corresponding to the MP joint). It should be noted that the controller device 20 does not fall even if the user opens the hand while wearing the controller device 20 because the controller device 20 is fastened to the user's hand by the fixture 220.

In an example of the present embodiment, the finger sensors 241 are each an optical sensor, include a light-emitting section for emitting infrared light, a light reception section for detecting infrared light, and measure the ratio of light that enters the reception section after emission from the light-emitting section and reflection from a target, thus detecting a distance to an obstacle. The distance from the positions of the finger sensors 241 to the obstacle existing on the lateral side of the device main body 210 (side facing the fingers when the rear side of the device main body 210 is brought into contact with the user's palm) is detected. In this example, when the user fastens the device main body 210 to his or her hand and moves the hand starting from a finger extension state to firm holding of the device main body 210, the finger sensors 241 measure the distance to the obstacle existing in the direction of the finger tips (e.g., floor surface if the user is pointing his or her fingers down) with the fingers extended. Thereafter, when the user bends his or her fingers, the distance to the surface of each finger's second or third joint is detected, and when the user holds the device main body 210 firmly, the finger surface comes into contact with the finger sensor 241. Therefore, the distance detected by this finger sensor 241 is "0."

It should be noted that the finger sensors 241 may be provided to correspond to at least the index finger to the little finger, respectively, or that the finger sensors 241 may be provided to correspond to some of the index finger to the little finger (may be provided to correspond to only one finger) so that each acquires information regarding the distance to the obstacle. Further, the five or more finger sensors 241 may be provided and arranged in a straight line on a lateral side of the controller device 20 (side facing the fingers when the rear side of the device main body 210 is brought into contact with the user's palm). We also assume that these finger sensors 241 detect the distance to the obstacle repeatedly every given timing and output the detected distance information.

In the present embodiment, here, the control section 21 is a program-controlled device such as a central processing unit (CPU) and operates in accordance with the program stored in the storage section 22. In the present embodiment, this control section 21 receives, from the operation interface 23, information input indicating details of user operation on the operation section 212 and outputs the information to the information processing apparatus 1 via the communication section 26. Also, this control section 21 outputs information, output from the sensors included in the sensor section 24, to the information processing apparatus 1 via the communication section 26.

The storage section 22 is a memory device or other device and retains the program to be executed by the control section 21. This program may have been provided stored on a non-transitory computer-readable storage medium and copied to this storage section 22. Also, this storage section 22 operates as a work memory of the control section 21.

The operation interface 23 outputs, to the control section 21, information indicating details of user operation on the operation section 212. The sensor section 24 includes at least one sensor and outputs information output from this sensor to the control section 21. In an example of the present embodiment, this sensor section 24 may include, in addition to the finger sensors 241 described already, a tilt sensor 242 for detecting a tilt of the device main body 210 of the controller device 20 and an acceleration sensor 243 for detecting a motion of the controller device 20. Further, this sensor section 24 may include a plurality of capacitive sensors 245.

Here, the tilt sensor 242 detects and outputs information regarding a rotation angle around a longitudinal axis of the device main body 210 and information regarding an angle relative to an orientation of gravity of the longitudinal axis. The acceleration sensor 243 detects each acceleration exerted on the controller device 20 and outputs the detection result. It should be noted that the direction of acceleration here need only be determined in advance, for example, by defining the longitudinal direction of the controller device 20 as a Z axis, and, in a plane having this Z axis as the normal vector, the direction in which the user's fingers should point as an X axis, and the direction orthogonal to the X axis in the above plane as a Y axis.

The vibrator 25 corresponds to a vibrating element of the present invention, receives a signal input specifying a vibration period and a vibration intensity, and vibrates at the specified vibration period and vibration intensity. The communication section 26 is a wired interface such as a universal serial bus (USB) interface or a wireless interface such as Bluetooth (registered trademark) and outputs a variety of pieces of information to the information processing apparatus 1 in accordance with an instruction input from the control section 21.

Figure 3:
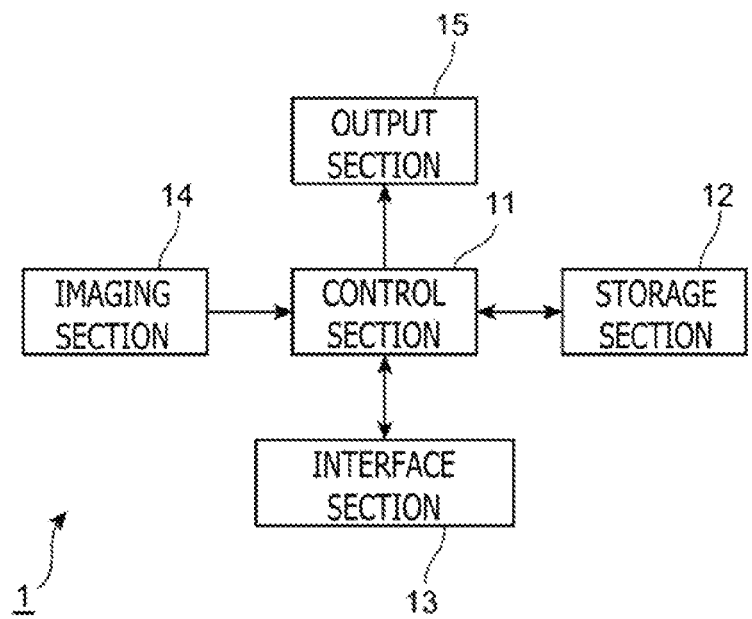
FIG. 3 is a configuration block diagram illustrating an example of an information processing system according to the embodiment of the present invention.

The information processing apparatus 1 includes a control section 11, a storage section 12, an interface section 13, an imaging section 14, and an output section 15 as illustrated in FIG. 3. The control section 11 is a program-controlled device such as a CPU and operates in accordance with the program stored in the storage section 12.

The storage section 12 is a memory device or other device and retains the program to be executed by the control section 11. This program may have been provided stored on a non-transitory computer-readable storage medium and copied to this storage section 12. Also, this storage section 12 operates as a work memory of the control section 11.

The interface section 13 is connected to the controller device 20 in a wired or wireless manner, receives information indicating details of user operation from the controller device 20 and information regarding the distance detected by the finger sensor 241 (information regarding a plurality of distances detected by the finger sensors 241 corresponding to the respective fingers in the case where the plurality of finger sensors 241 are provided to correspond to the respective fingers) and outputs the information to the control section 11.

The imaging section 14 is a camera or other device installed in such a manner as to capture a region where the user is located, repeatedly captures an image including the user every given timing, and outputs the image data to the control section 11.

The output section 15 has, for example, a high-definition multimedia interface (HDMI) (registered trademark) interface or other interface for outputting video or other data to a home TV set. This output section 15 outputs video information to be displayed in accordance with an instruction input from the control section 11.

In an example of the present embodiment, the control section 21 of the controller device 20 receives information indicating the vibration intensity of the vibrating element from the information processing apparatus 1. Also, this control section 21 acquires information regarding the state of contact between the controller device 20 and the user's hand. Then, the control section 21 corrects the received information indicating the vibration intensity on the basis of the acquired information. The control section causes the vibrator 25, a vibrating element, to vibrate at the vibration intensity indicated by the information corrected here.

Here, the state of contact between the controller device 20 and the user's hand includes information regarding a contact area between the controller device 20 and the user's hand, information regarding a pressure applied to the controller device 20 by the user's hand, and so on.

Figures 4, 5:
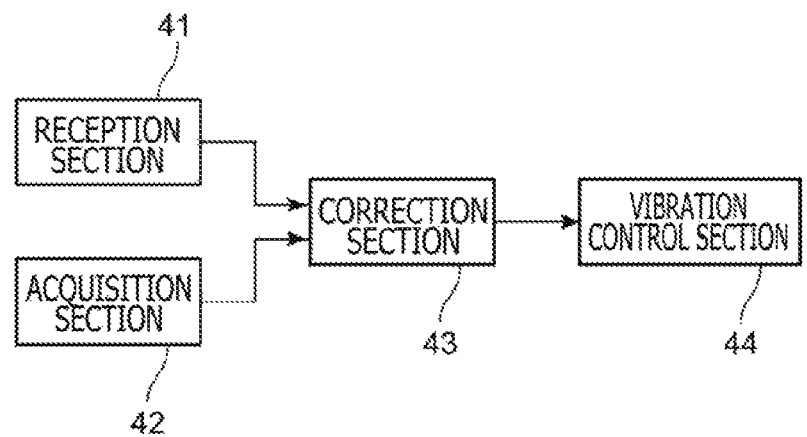
FIG. 4 is a functional block diagram illustrating an example of the controller device according to the embodiment of the present invention.
FIG. 5 is an explanatory diagram illustrating examples of correction parameters used by the information processing system according to the embodiment of the present invention.

The control section 21 in this example functionally includes a reception section 41, an acquisition section 42, a correction section 43, and a vibration control section 44 as illustrated in FIG. 4.

The reception section 41 receives information indicating the vibration intensity and the vibration frequency of the vibrator from the information processing apparatus 1. This information indicating the vibration intensity and the vibration frequency is specifically waveform information v(t) indicating a change in a vibration amplitude with respect to time t and may be similar to a voice signal. However, information indicating the vibration intensity and the vibration frequency in the present embodiment is not limited to waveform information and may be numerical information specifying the vibration intensity and numerical information specifying the vibration frequency.

The acquisition section 42 acquires information regarding the contact area between the controller device 20 and the user's hand. The acquisition section 42 according to an example of the present embodiment acquires a state of extension of the user's fingers as information regarding the contact area between the controller device 20 and the user's hand. That is, this acquisition section 42 acquires information indicating whether the user's fingers are bent and in contact with the surface of the device main body 210 (whether the controller device 20 is being gripped) or whether the user's fingers are extended and out of contact with the surface of the device main body 210 on the basis of distance information from the surface of the device main body 210 to the respective fingers detected by the finger sensors 241.

Specifically, the acquisition section 42 determines that the finger is bent and in contact with the surface of the device main body 210 (that the finger is gripping the controller device 20) in the case where the distance to a certain finger is "0" or smaller than a predetermined value. Also, the acquisition section 42 determines that the finger is extended and out of contact with the surface of the device main body 210 in the case where the distance to a certain finger is greater than a predetermined value.

The correction section 43 corrects information indicating at least one of the vibration intensity and the vibration frequency received by the reception section 41 on the basis of the information acquired by the acquisition section 42. In the following example, a description will be given of an example in which the vibration intensity is corrected to simplify the description. For example, this correction section 43 corrects the vibration intensity such that the larger extension of the user's fingers is, the higher the vibration intensity becomes. Specifically, the correction section 43 corrects the vibration intensity in the following manner on the basis of the number of fingers determined as being extended and out of contact with the surface of the device main body 210 (determined as not being gripping the controller device 20).

That is, the correction section 43 refers to preset correction rate information stored in the storage section 22. This correction rate information, for example, associates the number of fingers (n=0, 1, 2 and so on) not touching the surface of the device main body 210 with a correction rate r(n) of the vibration intensity as illustrated in FIG. 5. The correction section 43 performs the following calculation using the correction rate r(n) associated with the number n when the number of fingers that are extended and are not touching the surface of the device main body 210 is n from the information acquired by the acquisition section 42. That is, the correction section 43 outputs, as $V(t)=r(n) \times v(t)$, corrected waveform information V(t) for the waveform v(t) indicated by the information received by the reception section 41. In other words, this correction corresponds to multiplication of the amplitude of the waveform information v(t) by r(n)-fold.

Here, when the preset correction rate r(n) is a reduction rate of the vibration intensity (i.e., $0<r(n)\leq 1$), we assume, for N and n with N>n, that $r(N)<r(n)$. As a result, correction is performed such that the more fingers are extended and are not touching the surface of the device main body 210, that is, the larger extension of the user's fingers is, the smaller the reduction rate of the vibration intensity becomes, and the larger extension of the user's fingers is, the higher the vibration intensity becomes. Also, when the preset correction rate r(n) is an increase rate of the vibration intensity (i.e., r(n) 1), we assume, for N and n with N>n, that $r(N)<r(n)$. As a result, correction is performed such that the more fingers are extended and are not touching the surface of the device main body 210, that is, the larger extension of the user's fingers is, the greater the increase rate of the vibration intensity becomes, and the larger extension of the user's fingers is, the higher the vibration intensity becomes.

The vibration control section 44 receives input of the waveform information V(t) indicated by the corrected information from the correction section 43 and causes the vibrator 25, a vibrating element, to vibrate using the corrected waveform information V(t). Such a control method for causing a vibrating element such as vibrator to vibrate on the basis of waveform information is widely known. Therefore, a detailed description thereof is omitted here. It should be noted that when vibration intensity or vibration frequency information is input in place of waveform information, this vibration control section 44 causes the vibrating element to vibrate at an amplitude proportional to the vibration intensity indicated by the input information and at a frequency proportional to the vibration frequency indicated by the input information. It should be noted that in the case where one of the inputs is not available, the vibrating element need only be caused to vibrate at the vibration intensity or vibration frequency determined in advance as a default.

Also, the correction section 43 in an example of the present embodiment may correct the vibration intensity in accordance with the value of the distance to the finger(s) detected by the finger sensor 241 rather than correcting the vibration intensity in accordance with the number of fingers that are extended and are not touching the surface of the device main body 210 as described above.

For example, the correction section 43 may correct the vibration intensity in the following manner by using distances Li to the respective fingers (where i is an index corresponding to the index finger, middle finger, ring finger, or little finger and i=1, 2, 3, or 4) measured by the finger sensors 241 corresponding to the index finger, middle finger, ring finger, and little finger, respectively, in accordance with a statistical value L such as a mean thereof. That is, the correction section 43 performs correction such that the greater the statistical value L relating to the distance, that is, the larger extension of the user's fingers is, the higher the vibration intensity becomes. As an example, by using the increase rate r=($\alpha$L+1) that uses the statistical value L, the corrected vibration intensity V(t) for the vibration intensity v(t) indicated by information received by the reception section 41 is acquired as V(t)=r×v(t) and output. In other words, this correction corresponds to multiplication of the amplitude by r=($\alpha$L+1)-fold. It should be noted that a is a positive proportionality constant and need only be determined experimentally.

Also, this statistical value L may be a weighted mean. For example, the correction section 43 may use, depending on an attachment position of the vibrating element, a weight wn for the finger closest to the attachment position of the vibrating element when the fingers are bent and a weight wd for the fingers not closest thereto such that 0<wn<wd and calculate L=(wn×Ln+wd×(Ld1+Ld2+Ld3))/(wn+3wd) by using a distance Ln to the finger in contact with the position closest to the attachment position of the vibrating element and distances Ld1, Ld2, and Ld3 to other fingers.

Also, the correction section 43 may calculate L=$\Sigma$(wi×Li)/$\Sigma$wi by using a weight wi (where this i is also an index corresponding to the index finger, middle finger, ring finger, or little finger and i=1, 2, 3, or 4) that is set according to the distance between the position of each of the index finger, middle finger, ring finger, and little finger on the surface of the device main body 210 touched when each finger is bent and the position of the vibrating element such that the greater this distance, the greater the weight wi. Here, $\Sigma$ means the sum when i is varied from 1 to 4.

Further, in another example of the present embodiment, information regarding a degree of close contact between the controller device 20 and the hand or pressure may be used in place of or together with information based on the value of distance to the finger detected by the finger sensor 241 as information regarding the contact area between the controller device 20 and the user's hand. This information is used in consideration of the fact that the user perceives vibration differently between the case where the contact area with the user's palm is large and the case where the contact area with the user's palm is small.

As an example, the acquisition section 42 investigates the extent to which the controller device 20 itself vibrates (i.e., how much vibration is detected by the acceleration sensor 243) while the vibrating element vibrates as information regarding the contact area between the controller device 20 and the user's hand (at least part thereof). For example, the acquisition section 42 calculates the following by using acceleration magnitude information A (information regarding combined acceleration of accelerations Ax, Ay, and Az of the respective axes X, Y, and Z such as A=$\sqrt{(Ax^2+Ay^2+Az^2)}$) detected by the acceleration sensor 243 while the vibration control section 44 controls the vibration of the vibrator 25 as a vibrating element. That is, the acquisition section 42 finds E($\tau$)=A($\tau$)/V($\tau$), a ratio of the acceleration magnitude information A (it should be noted that this acceleration magnitude A will be denoted as A($\tau$) below because the magnitude A varies over time) relative to the corrected vibration intensity V($\tau$) used for vibration control. At this time, the more the vibration of the device main body 210 is kept down by the user's hand, the smaller the ratio E($\tau$) becomes. Presumably, therefore, the smaller the ratio E($\tau$) is, the closer the contact between the controller device 20 and the user's hand is, and the greater the ratio E($\tau$) is, the less close the contact between the controller device 20 and the user's hand is.

For this reason, the acquisition section 42 outputs information based on this ratio E($\tau$) as information regarding the contact area between the controller device 20 and the user's hand (at least part thereof). For example, the acquisition section 42 integrates this ratio E($\tau$) over the entire vibration time period (acquires an approximate integration result, for example, by summing the E($\tau$) values at given time intervals) and outputs result information $\epsilon$. With this integration result c, it can also be presumed that the contact between the controller device 20 and the user's hand is closer with the value $\epsilon$ being smaller, and the contact between the controller device 20 and the user's hand is less close with the value $\epsilon$ being greater.

It should be noted that the acquisition section 42 may also acquire the state of extension of the user's fingers as information regarding the contact area between the controller device 20 and the user's hand and output the state of extension of the user's fingers together with this information $\epsilon$ regarding ratio.

In this example, the correction section 43 performs correction such that, with the information $\epsilon$ regarding ratio output from the acquisition section 42 being greater (i.e., the presumably less close the contact between the controller device 20 and the user's hand), the vibration intensity v(t), indicated by information received by the reception section 41, is to be increased.

As an example, the correction section 43 generates a value $\beta$ greater than 1 by using the information $\epsilon$ regarding ratio (e.g., such that $\beta=\gamma\times(1+\epsilon)$ where $\gamma$ is a value greater than 1 and need only be determined experimentally) and outputs the corrected waveform information V(t) for the waveform information v(t) indicated by information received by the reception section 41 as $V(t)=\beta \times v(t)$. In other words, this correction corresponds to multiplication of the amplitude by $\beta$-fold.

It should be noted that when the acquisition section outputs information indicating the state of extension of the fingers together with the information £ regarding ratio, the correction section 43 may also use the correction parameter (r(n) or r described above) acquired on the basis of information indicating this state of extension of the fingers, acquire the corrected waveform information V(t) for the waveform information v(t) indicated by information received by the reception section 41 as $V(t)=\beta \times r(t) \times v(t)$ or $V(n)=\beta \times r \times V(t)$, and output $V(t)=\beta \times r(t) \times v(t)$ or $V(n)=\beta \times r \times v(t)$.

Further, in another example, in the case where the ratio $E(\tau)$ or $\varepsilon$ output from the acquisition section 42 exceeds (or falls below) a predetermined threshold, the correction section 43 may correct the waveform information v(t). The correction ratio in this case may be set by using predetermined $\beta'$ regardless of the ratio $E(\tau)$ and $\varepsilon$ such that $V(t)=\beta' \times v(t)$.

Figure 6:
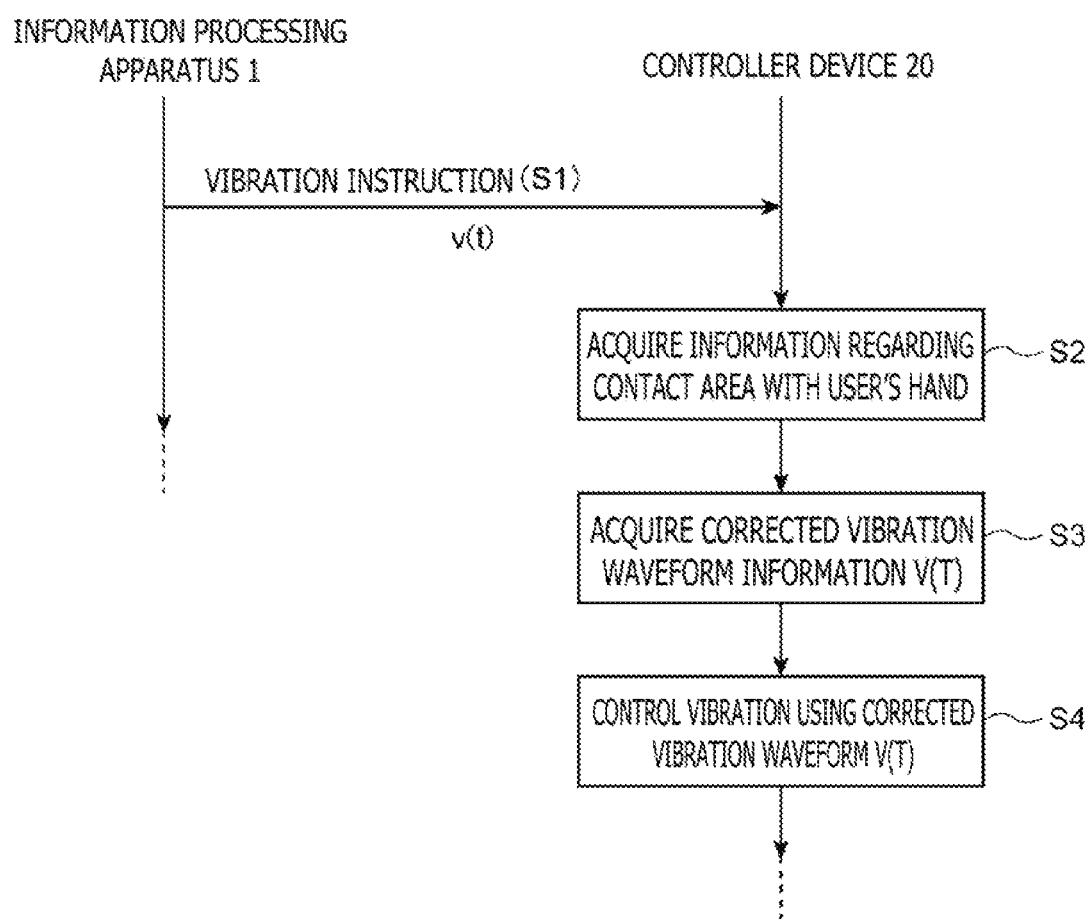
FIG. 6 is a flowchart illustrating an operation example of the information processing system according to the embodiment of the present invention.

[Operation] The information processing system according to an embodiment of the present invention is configured as described above and operates in the following manner. In the information processing system according to the present embodiment, the information processing apparatus 1 outputs an instruction presenting vibration to the controller device 20 in accordance with an instruction from an application program such as game program as illustrated in FIG. 6 (S1). This instruction is output, for example, as the waveform information v(t) indicating a change in the vibration intensity (vibration amplitude) with respect to time t.

The controller device 20 receives information indicating the vibration intensity from the information processing apparatus 1. Also, the controller device 20 acquires information regarding the contact area between the controller device 20 itself and the user's hand. Specifically, in an example of the present embodiment, the controller device 20 acquires information indicating whether the user's fingers are bent and in contact with the surface of the device main body 210 (whether the controller device 20 is being gripped) or whether the user's fingers are extended and out of contact with the surface of the device main body 210 on the basis of distance information from the surface of the device main body 210 to the respective fingers detected by the finger sensors 241.

Then, the controller device 20 finds the mean L by using the distances Li to the respective fingers (where i is an index corresponding to the index finger, middle finger, ring finger, or little finger and i=1, 2, 3, or 4) measured by the finger sensors 241 corresponding to the index finger, middle finger, ring finger, and little finger, respectively.

Here, the controller device 20 sets the increase rate as $r=(\alpha L+1)$ by using the mean L, the statistical value found. The controller device 20 acquires the corrected waveform information V(t) by multiplying the waveform information v(t) indicated by information received from the information processing apparatus 1 by this increase rate (by increasing the amplitude, the vibration intensity, by the increase rate r) (S3).

The controller device 20 causes the vibrator 25, a vibrating element, to vibrate on the basis of the corrected waveform information V(t) acquired here (S4).

According to this example, the larger extent of the user's fingers is, the greater the statistical value L relating to the distance is, and the vibration intensity is corrected to become larger. For this reason, even if the vibration instruction input from the information processing apparatus 1 is the same, the vibration is presented with a larger corrected amplitude when the user has his or her fingers off the controller device 20 than when the user is gripping the controller device 20 (the user's hand is in closer contact with the device main body 210 of the controller device 20). In this manner, an equivalent vibration experience is presented to the user regardless of whether the user's fingers are detached from the device main body 210.

Also, in an example of the present embodiment, the controller device 20 acquires the acceleration magnitude information A detected by the acceleration sensor 243 while causing the vibrator 25 as a vibrating element to vibrate. Then, the controller device 20 finds the mean (mean during vibration) £ of the ratio of this acceleration magnitude information A relative to the specified vibration (corrected vibration intensity).

Presumably, the smaller the value of this £ is, the closer the contact between the controller device 20 and the user's hand is, and the greater the value of £ is, the less close the contact between the controller device 20 and the user's hand is.

After finding the above value oft, the controller device 20 corrects the vibration intensity v(t) input from the information processing apparatus 1 such that, with the value of £ (i.e., the presumably less close the contact between the controller device 20 and the user's hand) being greater, the vibration intensity v(t) is to be increased. For example, the controller device 20 generates $\beta$, a value larger than 1 by using the above information £ regarding the ratio and by setting, for example, $0=\gamma \times (1+\varepsilon)$.

Then, when information indicating the waveform information v(t) is received from the information processing apparatus 1, the controller device 20 acquires the corrected waveform information V(t) for the waveform information v(t) indicated by the received information received as $V(t)=\beta \times r \times v(t)$ by using r, the correction parameter acquired on the basis of the information indicating the state of extension of the fingers, and $\beta$ generated here.

Then, the controller device 20 causes the vibrator 25, a vibrating element, to vibrate on the basis of the corrected waveform information V(t) acquired here.

According to an example of the present embodiment, the input vibration intensity is controlled such that, with the contact area between the user's hand and the controller device 20 being smaller, the vibration intensity is to be increased (the amplitude being increased). Also, the input vibration intensity is controlled such that, with the contact area between the user's hand and the controller device 20 being larger, the vibration intensity is to be reduced (the amplitude being dampened).

[Example of Performing Correction on the Information Processing Apparatus] Also, although, in the description given so far, the controller device 20 corrected information regarding vibration intensity or vibration frequency information received from the information processing apparatus 1, the correction of the vibration intensity or the vibration frequency may be handled by the information processing apparatus 1. In this case, the control section 11 of the information processing apparatus 1 handles the operation as the reception section 41, the acquisition section 42, and the correction section 43.

That is, in this example, the reception section 41 realized by the control section 11 receives an instruction for causing the controller device 20 to vibrate from the application program. Also in this case, information indicating the vibration intensity or vibration frequency is specifically the waveform information v(t) indicating a change in the vibration intensity (vibration amplitude) or the vibration frequency with respect to the time t and similar to an audio signal.

The acquisition section 42 of the control section 11 acquires information regarding the contact area between the controller device 20 and the user's hand. In this example, the control section 11 receives information indicating the state of extension of the user's fingers (e.g., the number of extended fingers, information regarding the distance to each finger) from the controller device 20.

The correction section 43 of the control section 11 corrects information indicating the vibration intensity or the vibration frequency received by the reception section 41 on the basis of information received by the acquisition section 42. The operation of this correction section 43 is similar to the operation in the case where the correction section 43 is realized by the control section 21 of the controller device 20. The control section 11 outputs, to the controller device 20, vibration intensity or vibration frequency information (corrected waveform information V(t)) acquired as a result of correction by this correction section 43.

Then, the controller device 20 receives the corrected waveform information V(t) from the information processing apparatus 1 and causes the vibrator 25, a vibrating element, to vibrate on the basis of the received and corrected waveform information V(t).

Also, in the case where the correction of the vibration intensity or the vibration frequency is handled by the information processing apparatus 1 as in this example, the information processing apparatus 1 may perform correction processes as processes of an application program such as a game program. In this case, the processes for correcting the vibration intensity or vibration frequency information are performed, for example, as game processes on the basis of information regarding the contact area between the controller device 20 and the user's hand. This makes it possible to perform the correction to suit details of the game.

[Example of Acquiring Information with Camera] It should be noted that in the case where correction is performed by the information processing apparatus 1 as described above, information regarding the contact area with the user's hand (e.g., information regarding extension of the user's fingers) may be received from the controller device 20. Instead of this, however, it may be determined whether the user's fingers are extended by detecting the hand position from a user image captured by the imaging section 14 and performing a process of recognizing, for example, the shape thereof.

As an example, correction may be performed such that the area of a rectangle circumscribing a skin color portion of a hand region detected from the user image is found and, that, in the case where this area exceeds a predetermined threshold, the vibration intensity of the waveform information v(t) specified by the application program is increased (the amplitude is increased) by assuming that the user's fingers are extended. Alternatively, correction may be performed such that in the case where the area falls below the above predetermined threshold, the vibration intensity of the waveform information v(t) specified by the application program is reduced (the amplitude is dampened) by assuming that the user's fingers are bent.

[Example of Using the Belt Length] Also, although, in the description given so far, the controller device 20 investigated the extent to which the controller device 20 itself vibrates (i.e., how much vibration is detected by the acceleration sensor 243) while the vibrating element vibrates as information indicating the degree of close contact between the controller device 20 itself and the user's hand. However, the present embodiment is not limited thereto.

Specifically, this information indicating the degree of close contact may indicate the diameter of the annular portion of the fixture 220 (or a circumferential length of the annular portion or a fastening position of the buckle). For example, the controller device 20 may find the circumferential length of the annular portion from an overall length of the belt and the fastening position of the buckle and use the circumferential length of the annular portion as information indicating the degree of close contact. In this example, the controller device 20 sends out the information to the information processing apparatus 1.

The information processing apparatus 1 is configured to have previously authenticated the user. The information processing apparatus 1 stores information regarding the degree of close contact such as circumferential length of the belt of the annular portion received from the controller device 20 on last p occasions (e.g., p is set, for example, to 5 in advance) for the authenticated user in advance. The information processing apparatus 1 acquires a ratio C/AV between an average AV of information regarding the degree of close contact received on the last p occasions and information C indicating the degree of close contact received from the controller device 20 this time. It should be noted that in the case where information on the last p occasions is not stored, a general users' average may be stored in the storage section in advance for use as the average AV.

Here, in the case where the ratio C/AV is used by using the circumferential length of the belt of the annular portion as information indicating the degree of close contact, the greater this value is above 1, the less close the contact (the looser the belt). For this reason, the information processing apparatus 1 or the controller device 20 corrects the corrected waveform information V(t) for the waveform v(t) indicated by the received information to V(t)=C/AV×v(t).

It should be noted that in the case where the information r(n) or r based on finger extension is already available, the information processing apparatus 1 or the controller device 20 sets the corrected waveform information V(t) for the waveform v(t) indicated by the received information such that V(t)=C/AV×r(n)×v(t) or V(t)=C/AV×r×v(t).

[Example of Using A Capacitive Sensor] Further, although, in an example of the present embodiment, information regarding the contact area between the controller device 20 itself and the user's hand was acquired from the state of extension of the user's fingers, how tight the belt is tightened (e.g., circumferential length of the belt of the annular portion), or the vibration intensity of the controller device 20 itself during vibration of the vibrating element, the present embodiment is not limited thereto.

For example, in another example of the present embodiment, the plurality of capacitive sensors 245 may be provided on the surface of the device main body 210 of the controller device 20 and in a region that can be touched by the user's hand. In this case, it is possible to more directly detect a contact area Q between the user's hand and the device main body 210 and a degree of close contact (with how much force the user's hand is pressing the surface of the device main body 210) F thanks to the output of each of the capacitive sensors 245.

Also in this case, it is only necessary to find, in advance, Q/Qav, the ratio between a reference contact area Qav and the detected contact area here, and F/Fav, the ratio between a reference degree of close contact and the degree of close contact detected here (it is only necessary to experimentally acquire a mean contact area and a degree of close contact) and set the corrected waveform information V(t) for the waveform v(t) indicated by the received information such that $V(t)=Q/Qav \times F/Fav \times v(t)$.

As a result, correction is performed such that, with the contact area indicated by information acquired by the above detection being smaller, the vibration intensity is to be increased.

[Example of Correction Performed in Different Manner] It should be noted that although, in the examples described so far, correction was performed such that, with the contact area between the controller device 20 and the user's hand being smaller, the vibration intensity is to be increased, the present embodiment is not limited thereto. Correction may be performed such that, with the contact area between the controller device 20 and the user's hand being smaller, the vibration intensity is to be reduced. The reason for this is that in the case where the contact area between the controller device 20 and the user's hand is excessively small, the vibration only probably produces a poor staging effect.

Also, the magnitude of the correction rate appropriate to the contact area may be set as a function of the contact area in advance rather than performing correction monotonously appropriate to the magnitude of the contact area between the controller device 20 and the user's hand (monotonously such that the vibration intensity is to be increased with the contact area being larger, or the vibration intensity is to be reduced with the contact area being larger) so that the correction rate is determined on the basis of the setting. For example, in the case where the contact area between the controller device 20 and the user's hand is smaller than a predetermined threshold, correction may be performed such that, with the contact area being smaller below the threshold, the vibration intensity is to be reduced, and in the case where the contact area is greater than the threshold, correction may be performed such that, with the contact area being larger above the threshold, the vibration intensity is to be reduced. In this example, in the case where the contact area is equal to the threshold, a vibration based on the waveform information v(t) is presented, and the farther away the contact area is from the threshold, the weaker the presented vibration from the waveform information v(t).

[Correction of the Vibration Frequency] It should be noted that examples have been described so far in which, of the waveform information v(t), the amplitude corresponding to the vibration intensity is increased or reduced, the present embodiment is not limited thereto. For example, correction may be performed, in place of correcting the amplitude of waveform information in the description given so far or together with amplitude correction at the time of amplitude correction, such that the vibration frequency is increased or reduced.

It should be noted that the correction that changes the vibration amplitude of the given waveform information v(t) can be realized by known processes such as pitch change. Therefore, a detailed description of the correction method is omitted. Also, both the vibration intensity and the vibration frequency may be corrected.

[Example of the Pressure Sensor] Further, in an example of the present embodiment, the controller device 20 may include a pressure sensor to detect the pressure applied to the controller device 20 by the user's hand as a piece of information regarding the degree of close contact between the controller device 20 and the user's hand (force with which the controller device 20 is gripped). A variety of kinds of sensors can be used as such a pressure sensor. Therefore, a detailed description is omitted here.

In the case where a pressure sensor is used in the present embodiment, and in the case where the pressure applied to the controller device 20 by the user's hand is greater than a predetermined threshold, the information processing apparatus 1 or the control section 21 of the controller device 20 may correct the vibration intensity or the vibration frequency.

Also, in the case where the pressure applied to the controller device 20 by the user's hand is lower than the threshold, the information processing apparatus 1 or the control section 21 of the controller device 20 may correct the vibration intensity, the vibration frequency, or other waveform information.

Further, the information processing apparatus 1 or the control section 21 of the controller device 20 may correct the vibration intensity, the vibration frequency, or other waveform information using a correction rate appropriate to the value of the pressure applied to the controller device 20 by the user's hand.

[Effect of the Embodiment] Thus, the present embodiment corrects the vibration intensity appropriate to the contact area between the user's hand and the controller device 20 even in the event of variation in the contact area, thereby presenting a stable sensation to users.

REFERENCE SIGNS LIST

1 Information processing apparatus
11 Control section
12 Storage section
13 Interface section
14 Imaging section
15 Output section
20 Controller device
21 Control section
22 Storage section
23 Operation interface
24 Sensor section
25 Vibrator
26 Communication section
41 Reception section
42 Acquisition section
43 Correction section
44 Vibration control section
210 Device main body
211 Grip section
212 Operation section
213 Position presentation section
220 Fixture
231 Button operation section
241 Finger sensors
242 Tilt sensor
243 Acceleration sensor
245 Capacitive sensors

The invention claimed is:
1. An information processing system comprising:
a controller device to be fastened to a user's hand; and
an information processing apparatus connected to the controller device to exchange information with the controller device, wherein
the controller device includes:
a vibrating element causing a housing of the controller device to vibrate;
reception means configured to receive information indicating at least one of a vibration intensity of the vibrating element and a vibration frequency thereof;

acquisition means configured to acquire information regarding a state of contact between the controller device and the user's hand; and vibration control means configured to cause the vibrating element to vibrate, wherein the controller device or the information processing apparatus includes:

correction means configured to correct information indicating at least one of the vibration intensity and the vibration frequency on a basis of information acquired by the acquisition means of the controller device, and wherein the vibration control means of the controller device causes the vibrating element to vibrate at the vibration intensity and the vibration frequency indicated by the corrected information.

2. The information processing system of claim 1, wherein the acquisition means acquires a state of extension of user's fingers as the information regarding the state of contact between the controller device and the user's hand, and wherein the correction means corrects information indicating at least one of the vibration intensity and the vibration frequency appropriate to the state of extension of the user's fingers.

3. The information processing system of claim 1, wherein the information acquired by the acquisition means includes information regarding a degree of close contact between the controller device and the user's hand, and wherein the correction means corrects information indicating at least one of the vibration intensity and the vibration frequency appropriate to the degree of close contact between the controller device and the user's hand.

4. The information processing system of claim 3, wherein the acquisition means has a pressure sensor and estimates the degree of close contact between the controller device and the user's hand on a basis of a detection result of the pressure sensor.

5. The information processing system of claim 3, wherein the acquisition means has an acceleration sensor and estimates the degree of close contact between the controller device and the user's hand on a basis of a detection result of the acceleration sensor while the vibrating element vibrates.

6. The information processing system of claim 1, wherein the acquisition means has a capacitive sensor and acquires information regarding the state of contact between the controller device and the user's hand using the capacitive sensor.

7. The information processing system of claim 6, wherein the correction means corrects information indicating at least one of the vibration intensity and the vibration frequency appropriate to a contact area, a piece of information regarding the state of contact indicated by the information acquired by the acquisition section.

8. A controller device to be fastened to a user's hand, the controller device comprising:

a vibrating element configured to cause a housing of the controller device to vibrate;

reception means configured to receive information indicating at least one of a vibration intensity of the vibrating element and a vibration frequency thereof;

acquisition means configured to acquire information regarding a state of contact between the controller device and the user's hand;

correction means configured to correct information indicating at least one of the received vibration intensity and the vibration frequency on a basis of information acquired by the acquisition means; and vibration control means configured to cause the vibrating element to vibrate at the vibration intensity and the vibration frequency indicated by the corrected information.

9. A method of controlling a controller device including a vibrating element, the method comprising the steps of:

causing the controller device to be fastened to a user's hand;

causing a housing of the controller device to vibrate via the vibrating element;

receiving information indicating at least one of a vibration intensity of the vibrating element and a vibration frequency thereof;

acquiring information regarding a state of contact between the controller device and the user's hand;

correcting information indicating at least one of the received vibration intensity and the vibration frequency on a basis of the acquired information; and causing the vibrating element to vibrate at the vibration intensity and the vibration frequency indicated by the corrected information.

* * * * *